United States Patent [19]
Nishiguchi et al.

[11] Patent Number: 5,452,136
[45] Date of Patent: * Sep. 19, 1995

[54] FUSED SEGMENT REFLECTING MIRROR

[75] Inventors: Kenichi Nishiguchi; Aki Sasaki; Izumi Mikami; Kouki Asari, all of Amagasaki, Japan

[73] Assignee: Mitsubishi Denki Kabushiki Kaisha, Tokyo, Japan

[*] Notice: The portion of the term of this patent subsequent to Oct. 4, 2011 has been disclaimed.

[21] Appl. No.: 218,575

[22] Filed: Mar. 28, 1994

Related U.S. Application Data

[62] Division of Ser. No. 914,436, Jul. 15, 1992, abandoned.

[30] Foreign Application Priority Data

Nov. 1, 1991 [JP] Japan ................................. 3-313107

[51] Int. Cl.$^6$ ............................................. G02B 5/08
[52] U.S. Cl. ................................... 359/848; 359/850; 359/851
[58] Field of Search ............... 359/846, 847, 848, 849, 359/850, 855, 853, 851

[56] References Cited

U.S. PATENT DOCUMENTS

| | | | |
|---|---|---|---|
| 3,514,275 | 5/1970 | Bray | 65/36 |
| 4,898,604 | 2/1990 | Sauerwein | 65/18.1 |
| 5,162,951 | 11/1992 | Sorce | 359/848 |
| 5,329,407 | 7/1994 | Sasaki et al. | 359/846 |

OTHER PUBLICATIONS

Pearson, et al., "Active Optics Correction of Thermal Distortion of a 1.8 meter Mirror", Optical Engineering, vol. 27, No. 2 Feb. '88, pp. 115–122.

Metropolis, et al., "Equation of State Calculations by Fast Computing Machines", the Journal of Chemical Physics, vol. 21, No. 6, Jun. '53, pp. 1087–1092.

Krim, et al., "Accomodating CTE Discontinuities in a ULE Mosaic Mirror", SPIE vol. 1236, pp. 605–614, Jan. 1990.

*Primary Examiner*—P. M. Dzierzynski
*Assistant Examiner*—John Juba, Jr.
*Attorney, Agent, or Firm*—Wolf, Greenfield & Sacks

[57] ABSTRACT

A reflecting mirror, wherein mirror segments are fused together thereby composing the reflecting mirror by formulating square sums of displacements at a plurality of sampling points on a mirror surface of the reflecting mirror as a function of a thermal expansion coefficient vector having components of deviations of thermal expansion coefficients of the respective mirror segments from the average thermal expansion coefficients of all the mirror segments, positions of the components corresponding to arranging positions of the respective mirror segments; generating a stochastic process wherein the smaller the square sum of the displacement of the thermal expansion coefficient vector, the larger the probability whereby the thermal expansion coefficient vector appears, by a computer using random numbers; selecting the thermal expansion coefficient vector minimizing the square sum of the displacement from the appeared thermal expansion coefficient vectors; and arranging and fusing together the mirror segments in accordance with the components thereof.

2 Claims, 8 Drawing Sheets

FUSED SEGMENT REFLECTING MIRROR

This application is a division of application Ser. No. 914,436, filed Jul. 15, 1992 abandoned.

BACKGROUND OF THE INVENTION

1. Field of the Invention

The present invention relates to a method of fabricating a reflecting mirror wherein, when a reflecting mirror utilized in, for instance, a reflecting telescope, is composed by fusing together mirror segments, the mirror segments are arranged and fused together so that the thermal deformation caused by the difference in thermal expansion coefficient among the component mirror segments, is minimized.

2. Discussion of Background

FIG. 6 is a perspective view showing a conventional reflecting mirror. In FIG. 6, a reference numeral 1 designates a reflecting mirror, which is composed by fusing together a plurality of hexagonal mirror segments (hereinafter, stacks) 2. The reflecting mirror is formed by determining the arrangement of the stacks 2 by intuition in accordance with individual cases, and by fusing them together. Furthermore, a surface of the reflecting mirror 1 is polished to form, for instance, a paraboloid or a hyperboloid with an accuracy of about 1/100 of the observed wavelength, so that visible light, or electromagnetic wave such as infrared rays emitted by a celestial body, is reflected and focused.

When the surface of the reflecting mirror 1 is provided with a complete paraboloid or the like, the incident electromagnetic wave from the celestial body geometrically converges into a point (focus). Actually, the diameter of the image of the celestial body is not nullified due to the diffraction phenomena of light. There is a theoretical limit determined by the aperture D of the reflecting mirror 1 and the wavelength λ of the incident electromagnetic wave.

This theoretical limit FWHM (Full Width at Half Maximum), is generally expressed as follows.

$$FWHM = 1.02 \times \lambda/D(\text{rad}) \qquad (1)$$
$$= 2.1 \times 10^5 \times \lambda/D(\text{arcsec})$$

This theoretical limit is a width of an intensity distribution of light wherein the intensity becomes a half of the maximum intensity as shown in FIG. 7. Accordingly, the theoretical limit in the size of the image of a star is determined by the aperture D of the reflecting mirror 1 and the wavelength λ of the incident electromagnetic wave. The larger the aperture D, the smaller the theoretical limit. Accordingly, increase in the aperture of the reflecting mirror 1 enables reduction in size of the image and hence is a significant contribution to the improvement of resolution, the improvement of limit of detection and reduction in exposure time.

However, since thermal expansion coefficients of the stacks 2 are actually not zero, the reflecting mirror 1 suffers a thermal deformation when a temperature thereof changes. When the thermal expansion coefficients of the respective stacks 2 are equal, the respective stacks 2 deform in similar figures. Accordingly, only a focus position of the reflecting mirror 1 moves, and an image formation accuracy thereof is not deteriorated. However, in practice, the stacks 2 differ from each other in thermal expansion coefficient, so that the reflecting mirror 1 is subject to irregular thermal deformation. When the aperture of the reflecting mirror 1 is large, since the number of stacks 2 increases, the deformation becomes more complicated and the deformation quantity is enlarged even by a little inclination.

Accordingly, when such a thermal deformation is caused, the light incident from the celestial body scatter as shown in FIG. 8. The image of the celestial body is provided with an intensity distribution as shown in FIG. 9, and becomes a dim image. Therefore, even when the aperture of the reflecting mirror 1 is enlarged, the advantage of reducing the theoretical limit, can not be realized.

As major causes of the nonuniformity of the thermal expansion coefficients of the stacks 2 which causes the nonuniform thermal deformation, a difference in gradients of the thermal expansion coefficients of the respective stacks 2 in the thickness directions thereof (which causes a bimetallic deformation) and dispersing of mean thermal expansion coefficients of the respective stacks 2, are pointed out. As a method of suppressing the thermal deformation as much as possible, a stack arrangement as shown in FIG. 10, is proposed (a first conventional example).

In FIG. 10, variables $\Delta\alpha_1, \ldots, \Delta\alpha_{37}$ attached to the respective stacks 2, respectively designate deviations of the mean thermal expansion coefficients of the respective stacks 2 from a mean value of the thermal expansion coefficients of all the stacks 2 (hereinafter, thermal expansion coefficient), which are classified into three groups (netting of crossing oblique lines, netting of dots, and without netting) in an order of size of the thermal expansion coefficients ($\Delta\alpha_1 \geq \Delta\alpha_2 \geq \ldots \geq \Delta\alpha_{37}$).

In this method, around the stacks 2 belonging to a group of large thermal expansion coefficients, the stacks 2 belonging to a group of medium thermal expansion coefficients, or a group of small thermal expansion coefficients, are arranged. In this way, a large thermal expansion of the stacks 2 belonging to the group of large thermal expansion coefficients, is alleviated by a small thermal expansion of the surrounding stacks 2, by which the deformation becomes local, and it is expected by intuition that the deformation quantity becomes far smaller than in the case wherein the distribution is deviated.

FIG. 11 is a sectional diagram of a reflecting mirror provided with actuators for correcting the thermal deformation (a second conventional example), wherein a reference numeral 1 designates the reflecting mirror, 3, a temperature sensor attached to the backface of the reflecting mirror 1, 4, a processing unit for calculating a corrective force based on a measured value of a temperature of the reflecting mirror 1 obtained by the temperature sensor 3, 5, an actuator controller, and 6, the actuators for correcting the thermal deformation by applying the corrective force on the reflecting mirror 1.

In this example, when the thermal deformation is to be corrected, if one intends to totally correct it, it becomes necessary to correct even irregularities having small pitches, which requires a large correcting force and is not practical. Therefore, the deformation is expanded into a series of finite terms or infinite terms which is a function of spatial frequencies. A correction is performed by choosing terms thereof having large pitches of irregularities. At this moment, irregularities having small pitches which remain uncorrected, become a residual deformation of a mirror surface thereof which deteriorates the quality of the image.

FIG. 12 shows an arrangement of the stacks 2 wherein the thermal deformation is predicted by intuition to concentrate on the terms having large pitches of irregularities, when only the terms having large pitches of irregularities, are to be corrected. In FIG. 12, the definition of variables $\Delta\alpha_1, \ldots, \Delta\alpha_{37}$ attached to the respective stacks 2, is the same as in the case of FIG. 10.

Since the conventional reflecting mirror is constructed as above, the arrangement of the respective stacks 2 is performed by intuition. Therefore, the arrangement is not necessarily the one for minimizing the thermal deformation.

SUMMARY OF THE INVENTION

It is an object of the present invention to provide a method of fabricating a reflecting mirror which minimizes the thermal deformation of the surface of the reflecting mirror.

It is an object of the present invention to provide a method of fabricating a reflecting mirror which minimizes the residual thermal deformation remaining in the reflecting mirror after correcting the thermal deformation by expanding the thermal deformation in a series as a functions of spatial frequencies.

According to a first aspect of the present invention, there is provided a method of fabricating a reflecting mirror, wherein mirror segments are fused together thereby composing the reflecting mirror comprising:

formulating square sums of displacements at a plurality of sampling points on a mirror surface of the reflecting mirror as a function of a thermal expansion coefficient vector having components of deviations of thermal expansion coefficients of the respective mirror segments from the average thermal expansion coefficients of all the mirror segments, positions of the components corresponding to arranging positions of the respective mirror segments;

generating a stochastic process wherein the smaller the square sum of the displacement of a thermal expansion coefficient vector, the larger the probability whereby the thermal expansion coefficient vector appears, by a computer using random numbers;

selecting the thermal expansion coefficient vector minimizing the square sum of the displacement from the appeared thermal expansion coefficient vectors; and arranging and fusing together the mirror segments in accordance with the components thereof.

According to a second aspect of the present invention, there is provided a method of fabricating a reflecting mirror, wherein mirror segments are fused together thereby composing the reflecting mirror composing:

expanding a thermal deformation of the reflecting mirror in a series having finite terms which is a function of spatial frequency;

formulating a square sum of components of a residual deformation vector signifying a residual deformation quantity after correcting predetermined terms of the finite terms as a function of a thermal expansion coefficient vector having components of deviations of thermal expansion coefficients of the respective mirror segments from the average thermal expansion coefficients of all the mirror segments, positions of said components corresponding to arranging positions of the respective mirror segments;

generating a stochastic process wherein the smaller the square sum of the components of the residual deformation vector, the larger the probability whereby the thermal expansion vector appears, by a computer using random numbers;

selecting the thermal expansion coefficient vector minimizing the square sum of the components of the residual deformation vector from the appeared thermal expansion coefficient vectors; and arranging and fusing together the mirror segments in accordance with the components thereof.

The method of fabricating a reflecting mirror according to the first aspect of the present invention, considerably reduces the thermal expansion quantity of the mirror surface of the reflecting mirror, by generating the stochastic process wherein the smaller the square sum of the deformations of the mirror face of the reflecting mirror, the larger the probability whereby the thermal expansion coefficient vector appears, by a computer using random numbers, by selecting the thermal expansion coefficient vector minimizing the square sum of the displacement among these, and by arranging and fusing together the stacks in accordance with the components.

Furthermore, the method of fabricating a reflecting mirror according to the second aspect of the present invention, considerably reduces the residual deformation quantity remained after the correction of the mirror surface of the reflecting mirror, by generating the stochastic process wherein the smaller the square sum of the components of the residual deformation vectors of the surface of the reflecting mirror, the larger the probability whereby the thermal expansion coefficient vector appears by a computer utilizing random numbers, by selecting the thermal expansion coefficient vector minimizing the square sum of the displacement among these, and by arranging and fusing together the stacks in accordance with the components.

DETAILED DESCRIPTION OF THE PREFERRED EMBODIMENTS

EXAMPLE 1

Figure 1:
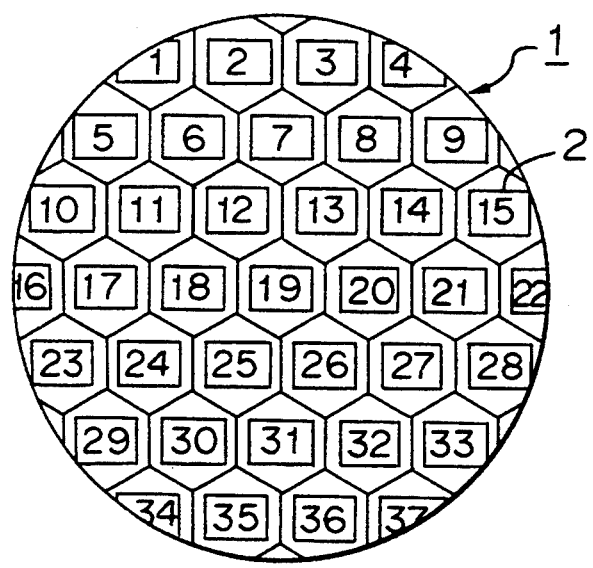
FIG. 1 is a plan view showing arranged positions of stacks of a reflecting mirror according to the first and the second aspects of the present invention.

An embodiment of the first aspect of the present invention will be explained referring to the drawings. In FIG. 1, a reference numeral 1 designates a plan view showing a reflecting mirror 1 composed of 37 of stacks 2, wherein the numbers 1 , . . . , 37 attached to the respective stacks 2 designate the positions thereof in the reflecting mirror 1.

Figure 2:
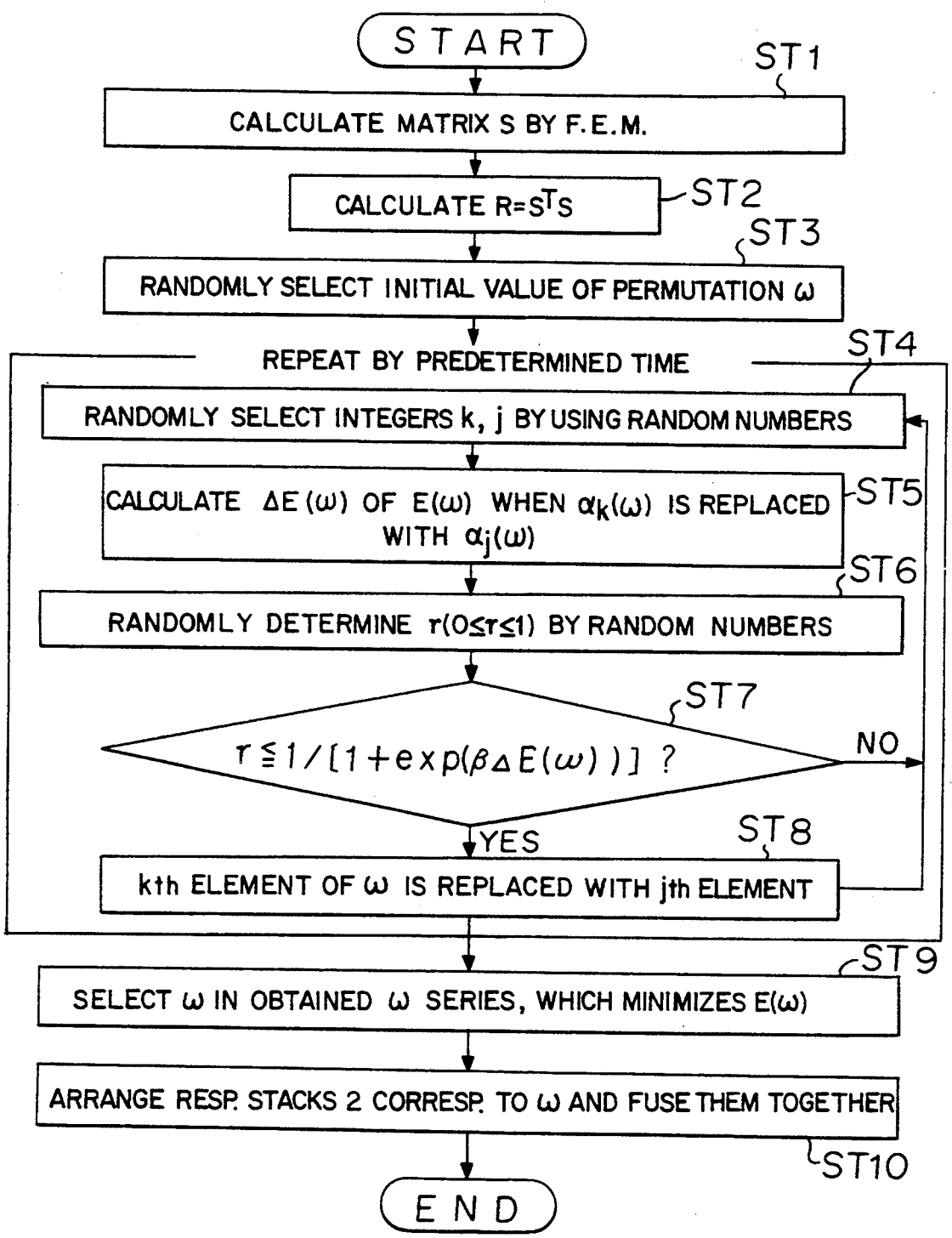
FIG. 2 is a flowchart showing an embodiment of a method of fabricating a reflecting mirror according to the first aspect of the present invention.

Next, explanation will be given to the operation utilizing a flowchart of FIG. 2. First, deviations of thermal expansion coefficients of the respective stacks 2 from a mean value of the thermal expansion coefficients of 37 of the stacks 2 to be arranged to 37 of stack positions (hereinafter, thermal expansion coefficient) are determined as $\Delta\alpha_1 \geq \Delta\alpha_2 \geq \ldots \geq \Delta\alpha_{37}$ in an order of size. Accordingly, determining the stack positions, signifies corresponding the deviations $\Delta\alpha_j$ (j=1, ..., 37) to the stack positions of FIG. 1. Furthermore, displacements at respective thermal displacement measuring points (sampling points) set as they are disposed at equal intervals on the mirror surface of the reflecting mirror 1, by, for instance, 1,000 points, are defined as $\Delta Z_k$ (k = 1, ..., 1,000).

When the thermal expansion coefficients $\Delta\alpha_j$ (j=1, ..., 37) are arbitrarily given to the respective stacks 2, the displacements $\Delta Z_k$ (k=1, ..., 1,000) of the respective thermal displacement measuring points when temperature is changed by $\Delta T$, can be calculated by Finite Element Method. Accordingly, $\Delta\alpha_j$ (j=1, ..., 37) and $\Delta Z_k$ (k=1, ..., 1,000) have a relation as follows, utilizing a 1,000×37 matrix S which does not depend on the thermal expansion coefficients $\Delta\alpha_j$ (j=1, ..., 37) of the stack 2.

$$\begin{vmatrix} \Delta Z_1 \\ \Delta Z_2 \\ \cdot \\ \cdot \\ \cdot \\ \Delta Z_{1000} \end{vmatrix} = |S| \begin{vmatrix} \Delta\alpha_1 \\ \Delta\alpha_2 \\ \cdot \\ \cdot \\ \cdot \\ \Delta\alpha_{37} \end{vmatrix} \times \Delta T \quad (2)$$

As shown in this equation, the fist column of the matrix S can be calculated as the displacement vector $\Delta Z_k$ (k=1, ..., 1,000), when $(\Delta\alpha_1, \Delta\alpha_2, ..., \Delta\alpha_{37})=(0, 1, 0, ..., 0)$ and the temperature change is determined as $\Delta T=1°$ C. Similarly, the second column or the columns therebelow can be calculated as the $\Delta Z_k$ (k=1, ..., 1,000), when $(\Delta\alpha_1, \Delta\alpha_2, ..., \Delta\alpha_{37})=(0, 1, 0, ..., 0)$, $(\Delta\alpha_1, \Delta\alpha_2, ..., \Delta\alpha_{37})=(0, 0, 1, 0, ..., 0)$, ... (step ST1).

At this point, a displacement vector U and a thermal expansion coefficient vector $\alpha$ are defined as follows.

$$U = \begin{vmatrix} \Delta Z_1 \\ \Delta Z_2 \\ \cdot \\ \cdot \\ \cdot \\ \Delta Z_{1000} \end{vmatrix}, \alpha = \begin{vmatrix} \Delta\alpha_1 \\ \Delta\alpha_2 \\ \cdot \\ \cdot \\ \cdot \\ \Delta\alpha_{37} \end{vmatrix} \quad (3)$$

Then, the Equation (2) can be rewritten as follows.

$$U = S\alpha\Delta T \quad (4)$$

Furthermore, the size of the deformation can be evaluated by RMS (Root Mean Square) of a normal displacement, and in this example as follows.

$$RMS = \sqrt{\frac{\sum_{K=1}^{1000} (\Delta Z_k)^2}{1000}} \quad (5)$$

By this equation, to minimize the RMS, is to minimize the square sum $\Sigma_K=1, \ldots, 1000 \ (\Delta Z_k)^2$ of the respective displacements. This square sum can be shown as follows from equations (3) and (4).

$$\begin{aligned}\sum_{K=1}^{1000} (\Delta Z_k)^2 &= U^T U \\ &= (S\alpha\Delta T)^T (S\alpha\Delta T) \\ &= \alpha^T S^T S\alpha \ (\Delta T)^2 \end{aligned} \quad (6)$$

where the shoulder suffix ($^T$) designates a transposition of a matrix or a vector.

From Equation (6), it is found that to minimize the thermal displacement, is to minimize the value $\alpha^T S^T S\alpha$. Assuming $R=S^T S$, the matrix R becomes a symmetrical matrix of 37×37 without depending on the thermal expansion coefficient vector $\alpha$ (step ST2). Accordingly, the problem of the optimum arrangement becomes a problem of arranging the deviations $\Delta\alpha_1, \Delta\alpha_2, \ldots, \Delta\alpha_{37}$ in elements of the thermal expansion coefficient vector $\alpha$ so that $\alpha^T R\alpha$ is minimized.

Next, explanation will be given to how to arrange the thermal expansion coefficients $\alpha$ so that $\alpha^T R\alpha$ is minimized. For this purpose, assuming a set composing a total of permutations of integer number series {1, ..., 37}, and the set of the permutations is defined as $\Omega$. Elements $\omega$ of $\Omega$ designates the respective permutations. $\alpha(\omega)$ is assumed to be a thermal expansion coefficient vector $\alpha$ wherein components thereof are changeably arranged by the elements $\omega$. That is, in case of a permutation of $\omega$ as $\{i_1, i_2, \ldots, i_{37}\}$, $\alpha(\omega)=(\Delta\alpha_{i_1}, \Delta\alpha_{i_2}, \ldots, \Delta\alpha_{i_{37}})$. By this definition, the problem results in finding $\omega$ which minimizes an evaluation function defined as follows.

$$E(\omega) = \alpha^T(\omega) R\alpha(\omega) \quad (7)$$

To find out $\omega$ minimizing the $E(\omega)$, a probability distribution is considered as follows.

$$\pi(\omega) = \exp\{-\beta E(\omega)\}/Z \quad (8)$$

where $\beta$ is a pertinent parameter having a positive value, and Z, a normalizing constant defined as follows.

$$Z = \sum_{\omega \in \Omega} \exp\{-\beta E(\omega)\} \tag{9}$$

As is apparent in Equation (8), the smaller the value of $E(\omega)$, the larger the probability, when $\omega$ is selected as such. The larger the value of the parameter $\beta$, the more significant the tendency. Accordingly, if it becomes possible to artificially generate a stochastic process (time series of $\omega$) having the probability distribution as in Equation (8), it can be expected with high probability that the value of $E(\omega)$ with respect to the obtained sample is extremely adjacent to the minimum value.

The stochastic process having the probability distribution as in Equation ($\omega$), can be generated by a computer utilizing random numbers as follows.

(1) An initial value of $\omega$ is selected at random from the set $\Omega$ of permutations by utilizing random numbers (step ST3).

(2) Two integers k and j are selected at random from the integer series $\{1, \ldots, 37\}$ by using random numbers. (step ST4).

(3) An increment $\Delta E(\omega)$ of $E(\omega)$ is obtained as follows when a component of $\alpha_k(\omega)$ of $\alpha(\omega)$ is substituted by $\alpha_j(\omega)$ as follows (step ST5).

$$\Delta E(\alpha) = -2\{\alpha_j(\omega) - \alpha_k(\omega)\}\Sigma_{i=1} \quad (R_{ji} - R_{ki})\alpha_i(\omega) - \\ + \{\alpha_j(\omega) - \alpha_k(\omega)\}^2(R_{jj} - 2R_{kj} + R_{kk}) \tag{10}$$

(4) Next, a determination is performed whether $\alpha_k(\omega)$ is to be substituted by $\alpha_j(\omega)$, in accordance with a probability shown as follows.

$$P \text{ (substitution is performed for } \alpha_k(\omega) \text{ and } \alpha_j(\omega)) = 1/\{1 + \exp[\beta \Delta E(\omega)]\} \tag{11}$$

Specifically, a uniform random number r wherein $0 \leq r \leq 1$, is generated (step ST6). Comparison is made between sizes of r and $1/[1+\exp\{\beta \Delta E(\omega)\}]$ (step ST7). When r is smaller than the other, substitution of $\alpha_k(\omega)$ and $\alpha_j(\omega)$ is performed (step ST8). When r is larger than the other, the substitution is not performed.

(5) The operation returns to (2) and repeats the same steps.

The above steps are specified by transpositions of arbitrary two elements, that is, a probability law of interchange. However, the transition from an arbitrary permutation to another permutation can be represented by a product of the interchanges. Accordingly, the generated stochastic process goes around a total of the set $\Omega$ of permutations. After a sufficient time, the distribution of the stochastic process approaches to a stationary distribution in $\Omega$. This stationary distribution is equal to the probability distribution of Equation (8) as shown in N. Metropolis et al, "Equation of State Calculations by Fast Computing Machines, "J. Chem. Phys., Vol. 21, 1953, pp. 1087-1091.

In this way, a series of permutation $\omega$ whereby the probability of minimizing the value of the evaluation function $E(\omega)$, is large, is obtained. Accordingly, among these, a permutation $\omega$ minimizing the value of $E(\omega)$, is selected (step ST9). Finally, the respective stacks 2 are arranged and fused together in accordance with the permutation $\omega$ obtained by the above means (step ST10).

EXAMPLE 2

Figure 4:
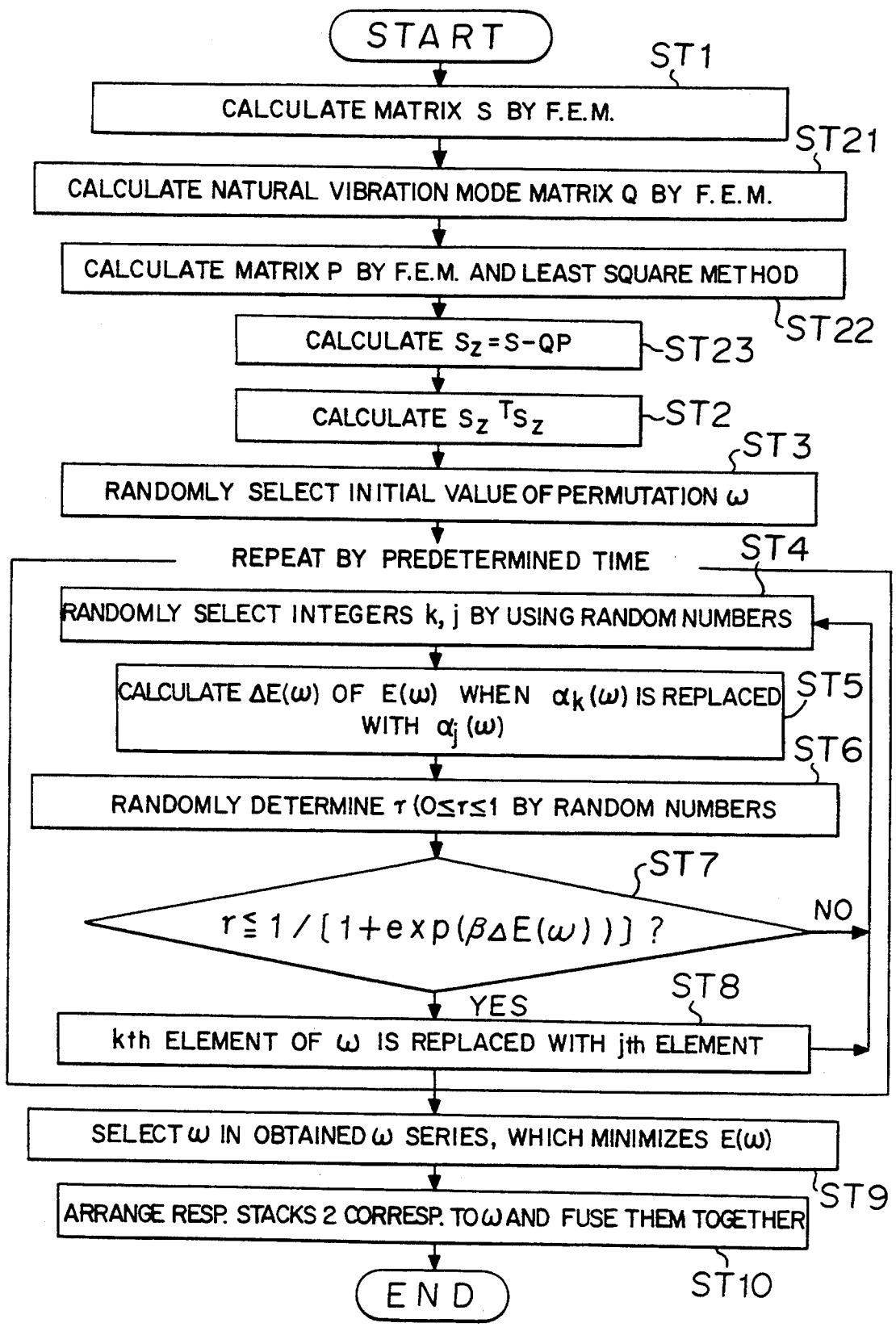
FIG. 4 is a flowchart showing an embodiment of a method of fabricating a reflecting mirror according to the second aspect of the present invention.

Next, explanation will be given to another embodiment of this invention using a flow chart of FIG. 4. In this example, the thermal deformation is expanded in modes. Predetermined terms are corrected. At this occasion, the respective stacks 2 are arranged so that the residual deformation after the correction is minimized.

First, as in Example 1, the matrix S is calculated by Finite Element Method (step ST1). The relationship between the displacement vector U and the thermal expansion coefficient vector $\alpha$ becomes as Equation (4). The residual deformation after the correction is the displacement vector U subtracted by the correction quantity. Therefore, to obtain the relationship between the residual deformation and the thermal expansion coefficient vector $\alpha$, the relationship between the correction quantity and the thermal expansion coefficient vector $\alpha$ should be obtained.

Figure 3:
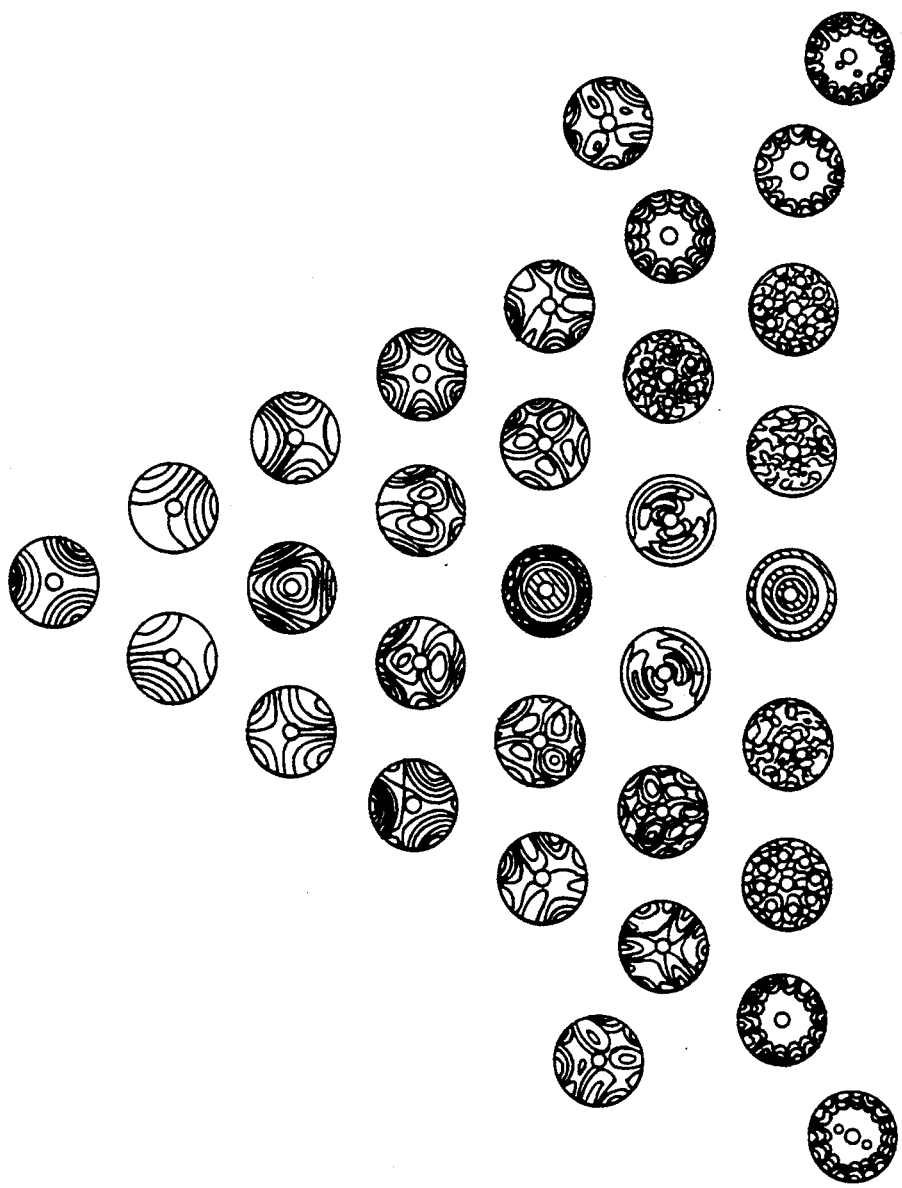
FIG. 3 is a plan view showing contour maps in respective modes of the natural vibration mode of the reflecting mirror in FIG. 1.

A specific explanation will be given to a case wherein 1st to 32nd modes of the natural vibration modes, are corrected. First, the displacement vector U can be expressed as a superposition of the natural vibration modes having infinite terms. The natural vibration modes can be calculated by using Finite Element Method. Examples of the deformation pattern of the natural mode are shown in FIG. 3. A deformation pattern $q_m$ of the mth natural vibration mode is expressed by the displacements $q_{mi}$ at the same coordinate point with that of the displacement vector U as follows.

$$q_m = \begin{vmatrix} q_{m,1} \\ q_{m,2} \\ \cdot \\ \cdot \\ \cdot \\ q_{m,1000} \end{vmatrix} \tag{12}$$

Assuming expansion coefficients (which correspond to amplitudes of the vibration mode) as $A_m$, the displacement vector U can be expressed as follows as a superposition of the natural vibration modes.

$$\begin{vmatrix} \Delta Z_1 \\ \Delta Z_2 \\ \cdot \\ \cdot \\ \cdot \\ \Delta Z_{1000} \end{vmatrix} = A_1 \begin{vmatrix} q_{1,1} \\ q_{1,2} \\ \cdot \\ \cdot \\ \cdot \\ q_{1,1000} \end{vmatrix} + A_2 \begin{vmatrix} q_{2,1} \\ q_{2,2} \\ \cdot \\ \cdot \\ \cdot \\ q_{2,1000} \end{vmatrix} + \ldots$$

$$\text{or } U = \sum_{m=1}^{\infty} A_m q_m \tag{13}$$

Among the series, the components up to 32 nd term become the correction quantity as follows.

$$\text{Correction quantity} = \sum_{m=1}^{32} A_m q_m \\ = QA \tag{14}$$

The expansion coefficient vector A and the matrix Q are defined as follows (step ST21).

$$A = \begin{vmatrix} A_1 \\ A_2 \\ \cdot \\ \cdot \\ \cdot \\ A_{32} \end{vmatrix} \quad (15)$$

$$Q = (q_1, q_2, \ldots, q_{32})$$

$$= \begin{vmatrix} q_{1,1} & q_{2,1} & \cdots & q_{32,1} \\ q_{1,2} & q_{2,2} & \cdots & q_{32,2} \\ \cdot & \cdot & \cdots & \cdot \\ \cdot & \cdot & \cdots & \cdot \\ \cdot & \cdot & \cdots & \cdot \\ q_{1,1000} & q_{2,1000} & \cdots & q_{32,1000} \end{vmatrix}$$

The thermal expansion coefficient vector $\alpha$ and the displacement vector U are in the linear relationship as shown in Equation (4). Also, the displacement vector U and the expansion coefficient A are in a linear relationship. Therefore, the thermal expansion coefficient vector $\alpha$ and the expansion coefficient A are also in a linear relationship. Accordingly, A can be expressed as follows by using a matrix P.

$$A = P\alpha\Delta T$$

or, $$\begin{vmatrix} A_1 \\ A_2 \\ \cdot \\ \cdot \\ \cdot \\ A_{32} \end{vmatrix} = \begin{vmatrix} P_{1,1} & \cdots & P_{37,1} \\ P_{1,2} & \cdots & P_{37,2} \\ \cdot & \cdots & \cdot \\ \cdot & \cdots & \cdot \\ \cdot & \cdots & \cdot \\ P_{1,32} & \cdots & P_{37,32} \end{vmatrix} \times \begin{vmatrix} \Delta\alpha_1 \\ \Delta\alpha_2 \\ \cdot \\ \cdot \\ \cdot \\ \Delta\alpha_{32} \end{vmatrix} \times \Delta T \quad (16)$$

P can be calculated as follows. The first column of P are expansion coefficients wherein the thermal deformation (which is the same with the first row of S) are expanded by the natural vibration modes, when the thermal expansion coefficient vector $\alpha$ is assumed as (1, 0, ..., 0). The thermal deformation is calculated by Finite Element Method. The mode expansion is calculated by methods such as fitting by least square method. The second column thereof can similarly be calculated by assuming $\alpha = (0, 1, 0, \ldots, 0)$ (step ST22).

In this way, the correction quantity QA is related to the thermal expansion coefficient vector $\alpha$ as $QA = Q-P\alpha\Delta T$.

Accordingly, the residual deformation vector $U_z$ can be expressed as follows by subtracting the correction quantity from the displacement vector U.

$$\begin{aligned} U_z &= U - QP\alpha\Delta T \\ &= S\alpha\Delta T - QP\alpha\Delta T \\ &= (S - QP)\alpha\Delta T \\ &= S_z\alpha\Delta T \end{aligned}$$

where $$S_z = S - QP \quad (17)$$

Accordingly, by using the residual deformation vector $U_z$ instead of the displacement vector U in Example 1 and $S_z$ instead of S, the optimum arrangement can be obtained as in Example 1 (step ST23). The treatment of step ST3 or steps therebelow is the same as in Example 1. Therefore, the explanation will be omitted.

Furthermore, in the above Examples 1 and 2, the methods of fabricating a reflecting mirror are explained wherein the thermal deformation quantity of the reflecting mirror 1 or the residual deformation after the correction, is minimized by using the deviations of the thermal expansion coefficients of the respective stacks 2 as the thermal expansion coefficient vector $\alpha$. However, the gradients of the thermal expansion coefficients of the respective stacks 2 in the thickness directions can be utilized as the thermal expansion coefficient vector $\alpha$, with the same effect as in the above Examples.

Figure 5:
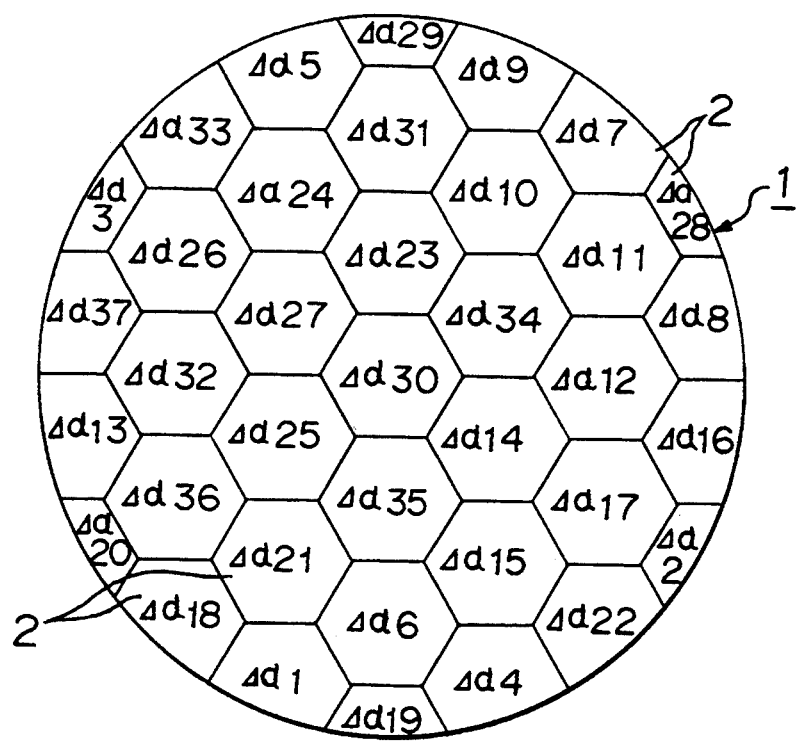
FIG. 5 is a plan view showing an example of a stack arrangement determined by using gradients of thermal expansion coefficients of stacks in the thickness directions according to the first and the second aspects of the present invention.
Figure 6:
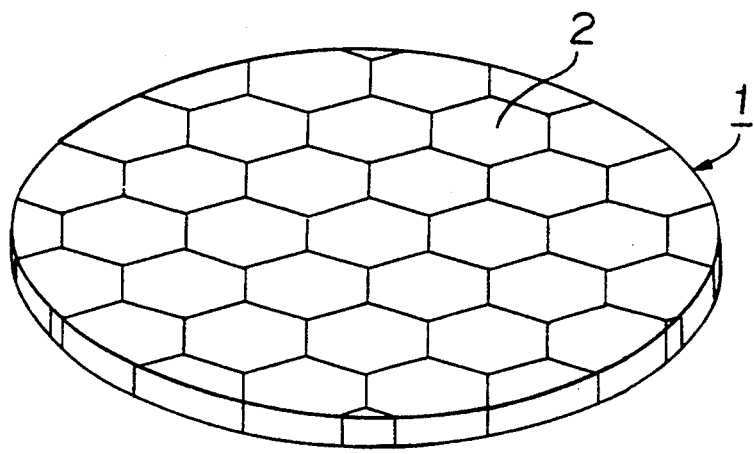
FIG. 6 is a perspective view showing construction of the conventional and the invented reflecting mirror.
Figure 7:
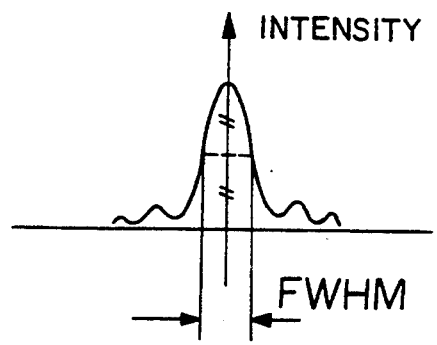
FIG. 7 is a characteristic diagram showing an intensity distribution of an image of a celestial body when there is no thermal deformation in a reflecting mirror.
Figure 8:
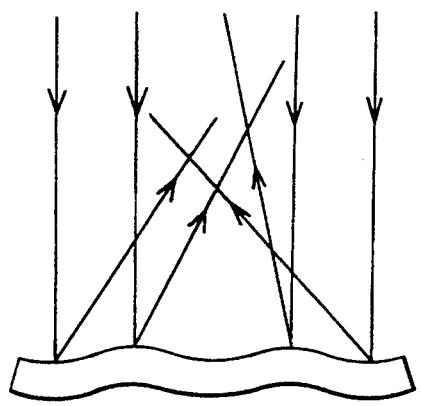
FIG. 8 is a sectional view of the reflecting mirror when it is thermally deformed.
Figure 9:
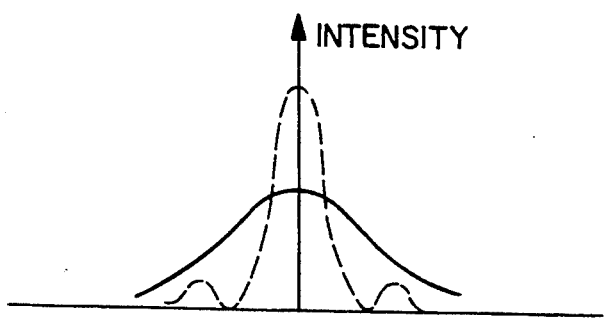
FIG. 9 is a characteristic diagram showing the intensity distribution of the image of the celestial body when there is a thermal deformation in the reflecting mirror.
Figure 10:
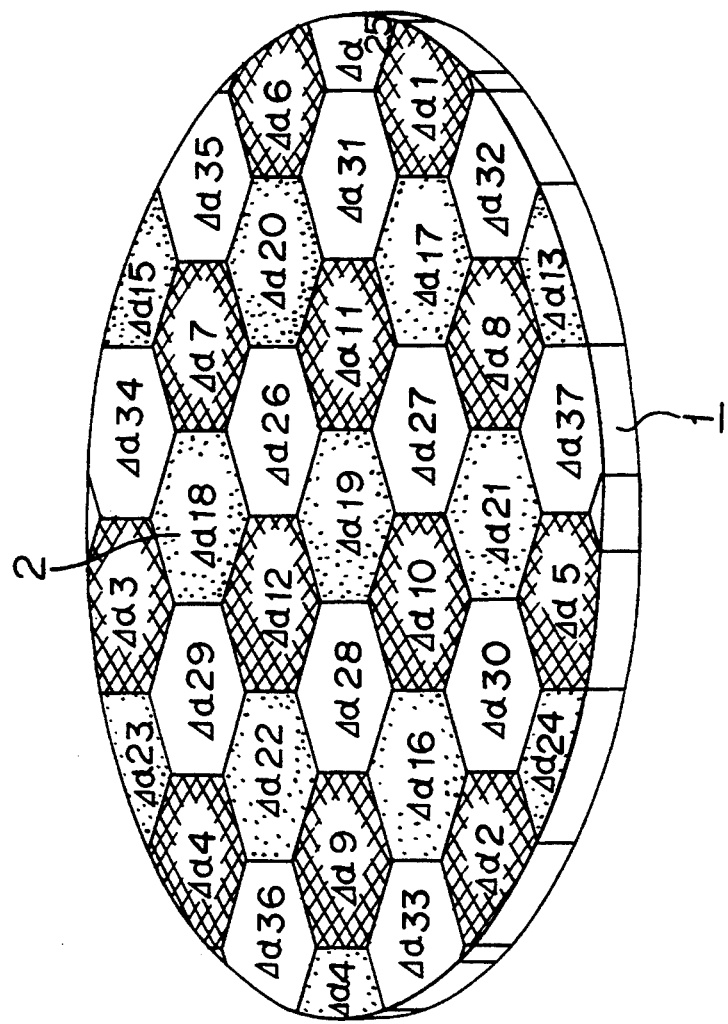
FIG. 10 is a perspective view showing a stack arrangement in the conventional reflecting mirror.
Figure 11:
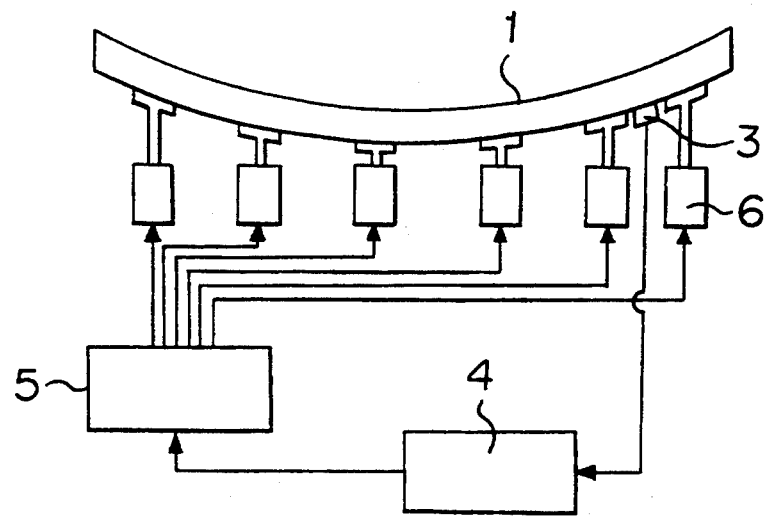
FIG. 11 is a sectional view showing a conventional reflecting mirror provided with actuators for correcting the thermal deformation.
Figure 12:
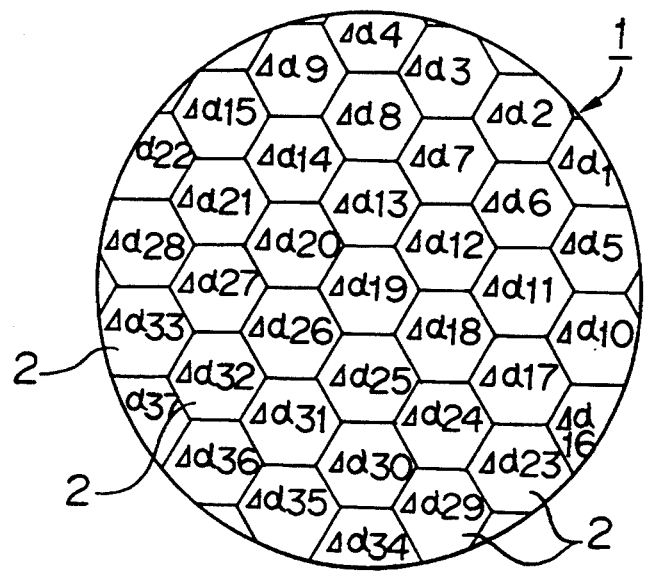
FIG. 12 is a plan view showing another stack arrangement in another conventional example.

When the gradients of the thermal expansion coefficients of the respective stacks 2 in the thickness directions are utilized as the thermal expansion coefficient vector $\alpha$, an example wherein the residual deformation quantity after the 1st to the 32nd natural vibration modes of the thermal deformation are corrected, is minimized, by which the slacks are arranged and fused together, is as shown in FIG. 5.

In FIG. 5, the variables $\Delta\alpha_1, \ldots, \Delta\alpha_{32}$, ($\Delta\alpha_1 \geq \Delta\alpha_2 \geq \ldots \Delta\alpha_{37}$) attached to the respective stacks 2, show the sizes of the gradients of the thermal expansion coefficients of the respective stacks in the thickness directions.

As stated above, according to the first aspect of this invention, the stochastic process wherein the smaller the square sum of the displacement of the surface of the reflecting mirror, the larger the probability whereby the thermal expansion coefficient vector appears, is generated by a computer using random numbers, the thermal expansion coefficient vector which minimizes the square sum of the displacement among these, is selected and the stacks are arranged and fused together in accordance with the components. Therefore, this invention has an effect wherein the thermal deformation of the reflecting mirror can be made extremely small.

According to the second aspect of the present invention, the stochastic process wherein the smaller the square sum of the components of the residual deformation vector, the larger the probability whereby the thermal expansion coefficient vector appears, by a computer using random numbers, the thermal expansion coefficient vector which minimizes the square sum of the displacement among these, is selected and the stacks are arranged and fused together in accordance with the components. Therefore, as in the first aspect of this invention, the residual deformation quantity of the reflecting mirror after the correction can extremely be made small.

What is claimed is:

1. A reflecting mirror, comprising:
    a plurality of mirror segments each having a thermal expansion coefficient and a corresponding deviation of the thermal expansion coefficient from an average of the thermal expansion coefficients of all the mirror segments;
    said mirror segments being fused in an arrangement in which a position of each segment corresponds to a position in a thermal expansion coefficient vector of the corresponding deviation, and said coefficient vector being a coefficient vector selected from a plurality of coefficient vectors, each having a different arrangement of components, the coefficient vector selected having a minimum square sum of displacements at a plurality of sampling points on the surface of the reflecting mirror.

2. A reflecting mirror, comprising:

a plurality of mirror segments each having a thermal expansion coefficient and a corresponding deviation of the thermal expansion coefficient from an average of the thermal expansion coefficients of all the mirror segments;

said mirror segments being fused in an arrangement in which a position of each segment corresponds to a position in a thermal expansion coefficient vector of the corresponding deviation, and said coefficient vector being a coefficient vector selected from a plurality of coefficient vectors, each having a different arrangement of deviations, the coefficient vector selected having a minimum square sum of components of a residual deformation vector for the reflecting mirror.

* * * * *